(12) United States Patent
Huang et al.

(10) Patent No.: US 8,089,600 B2
(45) Date of Patent: Jan. 3, 2012

(54) ACTIVE DEVICE ARRAY SUBSTRATE AND DISPLAY PANEL

(75) Inventors: Yen-Heng Huang, Taipei County (TW); Chung-Kai Chen, Taichung County (TW); Chia-Hui Pai, Taichung (TW); Hung-Lung Hou, Changhua County (TW); Chin-An Tseng, Taipei (TW); Chia-Yu Lee, Taipei County (TW); Chieh-Wei Chen, Taichung County (TW); Yi-Tsun Lin, Taipei (TW); Chun-Jen Chiu, Taichung (TW)

(73) Assignee: Au Optronics Corporation, Hsinchu (TW)

( * ) Notice: Subject to any disclaimer, the term of this patent is extended or adjusted under 35 U.S.C. 154(b) by 144 days.

(21) Appl. No.: 12/723,694

(22) Filed: Mar. 15, 2010

(65) Prior Publication Data
US 2011/0080542 A1    Apr. 7, 2011

(30) Foreign Application Priority Data
Oct. 5, 2009   (TW) ............................... 98133690 A

(51) Int. Cl.
*G02F 1/1345* (2006.01)

(52) U.S. Cl. ........ 349/152; 349/149; 349/150; 349/151; 349/106; 349/110

(58) Field of Classification Search .......... 349/149–158, 349/106, 110
See application file for complete search history.

(56) References Cited

U.S. PATENT DOCUMENTS

| | | | |
|---|---|---|---|
| 2005/0140892 A1 | 6/2005 | Kim et al. | |
| 2006/0028598 A1 | 2/2006 | Lee et al. | |
| 2006/0139554 A1* | 6/2006 | Park | 349/152 |
| 2007/0002263 A1 | 1/2007 | Kim et al. | |
| 2007/0109467 A1 | 5/2007 | Chang et al. | |
| 2007/0216832 A1 | 9/2007 | Takahashi et al. | |
| 2007/0287080 A1 | 12/2007 | Glazer et al. | |
| 2009/0115947 A1* | 5/2009 | Huang et al. | 349/106 |

FOREIGN PATENT DOCUMENTS
CN    101330060    12/2008
JP    2007-171620    7/2007

OTHER PUBLICATIONS

"First Office Action of China Counterpart Application", issued on Jan. 19, 2011, p.1-p.4, in which the listed reference was cited.

\* cited by examiner

*Primary Examiner* — David Nelms
*Assistant Examiner* — Phu Vu
(74) *Attorney, Agent, or Firm* — Jiang Chyun IP Office

(57) ABSTRACT

An active device array substrate including a substrate, an active device array, a black matrix, a color filter, at least a pad, and at least a contact window is provided. The substrate has a display region and a periphery circuit region. The pad is disposed in the display region or the periphery circuit region and is constituted by at least one of a first conductive layer and a second conductive layer. The contact window is disposed on the pad, through which a third conductive layer is connected to the pad. The contact window is surrounded by at least two different types of light-shielding patterns, wherein each light-shielding pattern surrounds only a part of the periphery of the contact window. The light-shielding patterns are selected form at least two of the black matrix, the color filter, the first conductive layer, and the second conductive layer.

37 Claims, 15 Drawing Sheets

A-A'

A-A'

A-A'

ACTIVE DEVICE ARRAY SUBSTRATE AND DISPLAY PANEL

CROSS-REFERENCE TO RELATED APPLICATION

This application claims the priority benefit of Taiwan application serial no. 98133690, filed on Oct. 5, 2009. The entirety of the above-mentioned patent application is hereby incorporated by reference herein and made a part of specification.

BACKGROUND OF THE INVENTION

1. Field of the Invention

The invention is related to an active device array substrate and a display panel, and in particular to an active device array substrate and a display panel which have a high aperture ratio.

2. Description of Related Art

A conventional liquid crystal display panel is formed by a color filter substrate, a thin film transistor (TFT) array substrate and a liquid crystal layer sandwiched therebetween. Nowadays, a color filter is directly integrated in color filter on array (COA) technologies, in which a color filter on array substrate is assembled with another opposite substrate, and liquid crystal molecules are filled in between the two substrates to form a liquid crystal display panel.

In a conventional color filter on array substrate, a contact window is formed on the circuits in a display region or is formed in a periphery circuit region, so as to connect upper and lower conductive layers. An opening is also formed at a position on a black matrix corresponding to the contact window, and the black matrix covers the periphery of the contact window, so that the black matrix shields light leakage at the periphery of the contact window.

In other words, in order to prevent light leakage at the periphery of the contact window, the size of the conventional contact window or the size of the lower pad is limited by the size of the opening that may be formed in the black matrix, that is, being limited by the resolution of the process of the black matrix, thereby affecting overall reliability of the whole process.

SUMMARY OF THE INVENTION

The invention provides an active device array substrate, wherein a size of a contact window is not limited by a resolution of a process of a black matrix.

The invention further provides a display panel which utilizes the above active device array substrate.

In order to specifically describe the details of the invention, an active device array substrate is hereby provided. The active device array substrate includes a substrate, an active device array, a black matrix, a color filter, at least a pad, and at least a contact window. The substrate includes a display region and a periphery circuit region, and the active device array is disposed in the display region. The black matrix and the color filter are disposed on the substrate. The pad is located in the display region or the periphery circuit region and is formed by at least one of the first conductive layer and the second conductive layer. The contact window is disposed on the pad, so that a third conductive layer above the pad is connected to the pad through the contact window. The contact window is surrounded by at least two different types of light-shielding patterns, and each light-shielding pattern only surrounds a part of the periphery of the contact window. The light-shielding patterns are selected from at least two of the black matrix, the color filter, the first conductive layer, and the second conductive layer.

According to an embodiment of the invention, the contact window is jointly surrounded by the black matrix pattern from the black matrix and by the color filter pattern from the color filter, wherein the black matrix pattern and the pad partially overlap, and the color filter pattern and the pad partially overlap.

According to an embodiment of the invention, the contact window is jointly surrounded by the first conductive pattern from the first conductive layer and by the black matrix pattern from the black matrix, wherein the first conductive pattern extends from the pad to outside the contact window, and the black matrix pattern and the pad partially overlap.

According to an embodiment of the invention, the contact window is jointly surrounded by the second conductive pattern from the second conductive layer and by the black matrix pattern from the black matrix, wherein the second conductive pattern extends from the pad to outside the contact window, and the black matrix pattern and the pad partially overlap.

According to an embodiment of the invention, the contact window is jointly surrounded by the first conductive pattern from the first conductive layer and by the color filter pattern from the color filter, wherein the first conductive pattern extends from the pad to outside the contact window, and the color filter pattern and the pad partially overlap.

According to an embodiment of the invention, the contact window is jointly surrounded by the second conductive pattern from the second conductive layer and by the color filter pattern from the color filter, wherein the second conductive pattern extends from the pad to outside the contact window, and the color filter pattern and the pad partially overlap.

According to an embodiment of the invention, the contact window is jointly surrounded by the first conductive pattern from the first conductive layer and by the second conductive pattern from the second conductive layer, wherein each of the first conductive pattern and the second conductive pattern extends from the pad to outside the contact window.

According to an embodiment of the invention, the contact window is jointly surrounded by the first conductive pattern from the first conductive layer, by the second conductive pattern from the second conductive layer, and by the black matrix pattern from the black matrix, wherein the first conductive pattern extends from the pad to outside the contact window, the second conductive pattern extends from the pad to outside the contact window, and the black matrix pattern and the pad partially overlap.

According to an embodiment of the invention, the contact window is jointly surrounded by the first conductive pattern from the first conductive layer, by the second conductive pattern from the second conductive layer, and by the color filter pattern from the color filter, wherein the first conductive pattern extends from the pad to outside the contact window, the second conductive pattern extends from the pad to outside the contact window, and the color filter pattern and the pad partially overlap.

According to an embodiment of the invention, the contact window is jointly surrounded by the first conductive pattern of the first conductive layer, by the color filter pattern from the color filter, and by the black matrix pattern from the black matrix, wherein the first conductive pattern extends from the pad to outside the contact window, the color filter pattern and the pad partially overlap, and the black matrix pattern and the pad partially overlap.

According to an embodiment of the invention, the contact window is jointly surrounded by the second conductive pattern of the second conductive layer, by the color filter pattern from the color filter, and by the black matrix pattern from the black matrix, wherein the second conductive pattern extends from the pad to outside the contact window, the color filter pattern and the pad partially overlap, and the black matrix pattern and the pad partially overlap.

According to an embodiment of the invention, the contact window is jointly surrounded by the first conductive pattern from the first conductive layer, by the second conductive pattern from the second conductive layer, by the color filter pattern from the color filter, and by the black matrix pattern from the black matrix, wherein the first conductive pattern extends from the pad to outside the contact window, the second conductive pattern extends from the pad to outside the contact window, the color filter pattern and the pad partially overlap, and the black matrix pattern and the pad partially overlap.

According to an embodiment of the invention, the pad includes the second conductive pattern from the second conductive layer, wherein the contact window exposes at least a part of the second conductive pattern, and the third conductive pattern is connected to the second conductive pattern through the contact window.

According to an embodiment of the invention, the active device array substrate further includes a spacer which is disposed on the pad and covers the joint region of the first conductive layer and the second conductive layer.

According to an embodiment of the invention, the color filter is selected from one of the groups including any combination of a red filter, a green filter, a blue filter, and a white filter.

According to an embodiment of the invention, the first conductive layer or the second conductive layer is a metal layer.

According to an embodiment of the invention, the third conductive layer is a transparent conductive layer.

According to an embodiment of the invention, the active device array is a thin film transistor array.

A display panel is hereby further provided, which includes the active device array substrate, an opposite substrate, and a display medium layer, wherein the display medium layer is disposed between the active device array substrate and the opposite substrate.

According to an embodiment of the invention, the display medium layer is a liquid crystal layer.

Due to the above, the invention utilizes different types of combinations of the black matrix, the color filter, the first conductive layer, and the second conductive layer to shield the periphery of the contact window, so that the size of the contact window is not limited by the resolution of the process of the black matrix, thereby being beneficial to reducing fabricating costs and enhancing reliability of processes.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The contact window provided by the invention is capable of being applied to any type of active device array substrate, such as a color filter on array substrate in a liquid crystal display panel, so as to connect different conductive layers in a display region or a periphery circuit region.

Figure 1A:
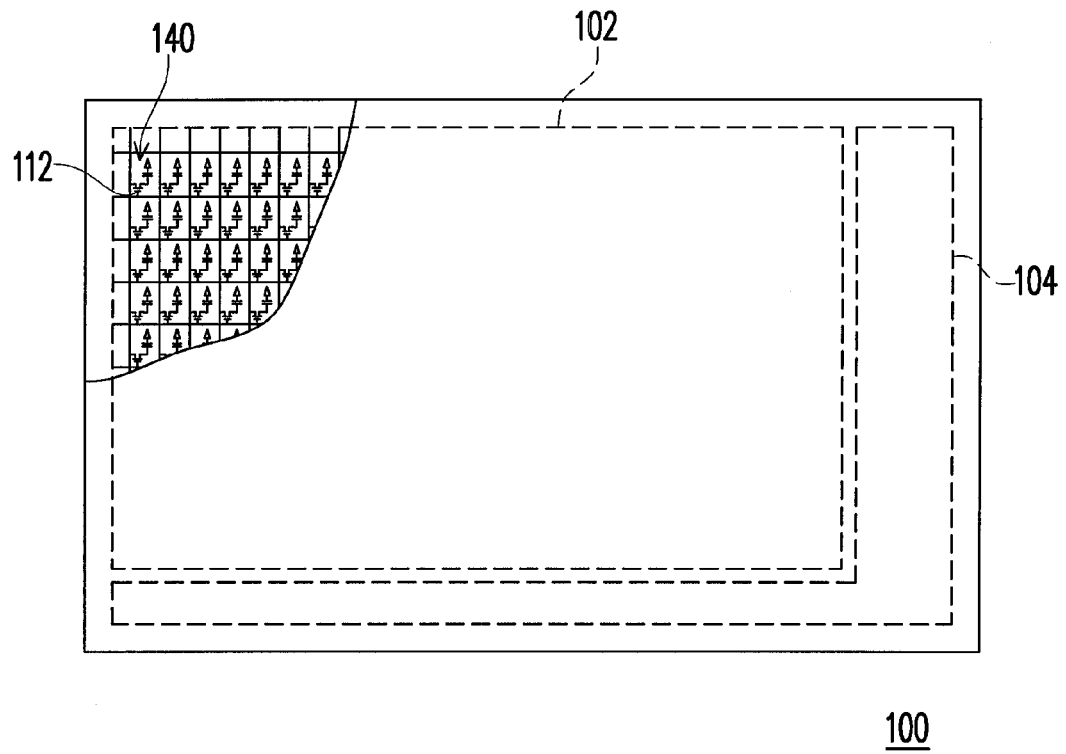
FIG. 1A is a top view of a display panel according to an embodiment of the invention.
Figure 1B:
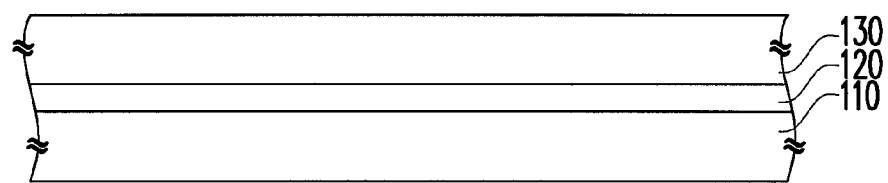
FIG. 1B shows a cross-sectional view of the display panel in FIG. 1A.

FIG. 1A is a top view of a display panel according to an embodiment of the invention, and FIG. 1B shows a cross-sectional view of the display panel in FIG. 1A. As shown in FIGS. 1A and 1B, a display panel 100 includes an active device array substrate 110, a display medium layer 120, and an opposite substrate 130. The display panel 100 includes a display region 102 and a periphery circuit region 104. The active device array substrate 110 includes a plurality of active devices 112 disposed in a matrix arrangement in the display region 102, for example thin film transistors, which are used to drive corresponding pixels 140. In addition, the type of the display panel is not limited; by including different display medium layers, the display panel has different functioning mechanisms. For example, the display medium layer may include a liquid crystal material, so that the display panel is a liquid crystal display panel. Moreover, a color filter may be included in the opposite substrate 130 or fabricated on the active device array substrate 110. When the color filter is located above the active devices 112, the active device array substrate 110 is a color filter on array substrate, and when the color filter is located below the active devices 112, the active device array substrate 110 is an array on color filter (AOC) substrate.

The contact window provided by the invention may be disposed in the display region 102 or in the periphery circuit region 104 of the active device array substrate 110, so as to provide functions such as connection between upper and lower layers of circuits or between devices and circuits. In addition, different from conventional art, an opening formed in a black matrix for housing the contact window is not required in the invention. Instead, film layers which have light-shielding effects such as the black matrix, the color filter, and a plurality of conductive layers which are optional on the active device array substrate 110 and which have light-shielding effects are used to surround the contact window. In other words, at least two types of non-transparent film layers jointly define an opening for housing the contact window and provide light-shielding effects for the periphery of the contact window. The following uses a thin film transistor array substrate as an example to illustrate different types of contact windows.

Figure 2A:
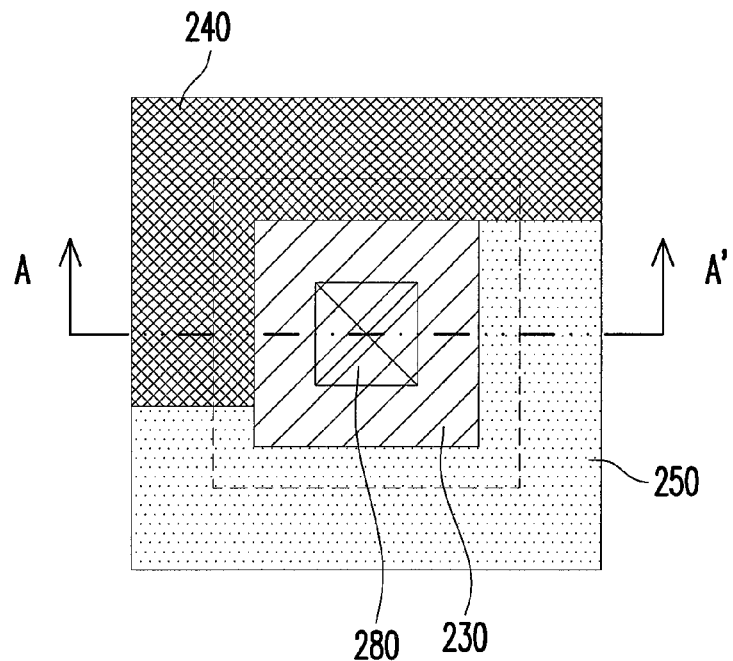
FIG. 2A is a top view of a contact window of a thin film transistor array substrate according to an embodiment of the invention.

FIG. 2A is a top view of a contact window of a thin film transistor array substrate according to an embodiment of the invention, and FIGS. 2B to 2E each shows a possible cross-sectional structure of the contact window in FIG. 2A. In order to clearly illustrate the positional relationships between relevant light-shielding film layers and the pad, film layers such as a gate insulating layer, a passivation layer, and a transparent conductive layer which are optional are omitted in FIG. 2A.

According to the present embodiment, the contact window in located in the periphery circuit region of the display panel. As shown in FIGS. 2A to 2E, a substrate 210 is covered by a gate insulating layer 220 and includes a pad 230. In addition, a contact window 280 is disposed on the pad 230 and exposes a part of the pad 230, so that another conductive layer 290 on the pad 230 is connected to the pad 230 through the contact window 280. The conductive layer 290 is, for example, a transparent conductive layer which is used to form pixel electrodes on the thin film transistor array substrate.

In order to provide light-shielding effects at the periphery of the pad 230, a black matrix pattern 240 from the black matrix and a color filter pattern 250 from the color filter jointly surround the contact window 280, so as to define the region of the contact window 280. Each of the black matrix pattern 240 and the color filter pattern 250 only surrounds a part of the periphery of the contact window 280, meaning that the black matrix pattern 240 and the pad 230 partially overlap, and the color filter pattern 250 and the pad 230 partially overlap.

Figure 2B:
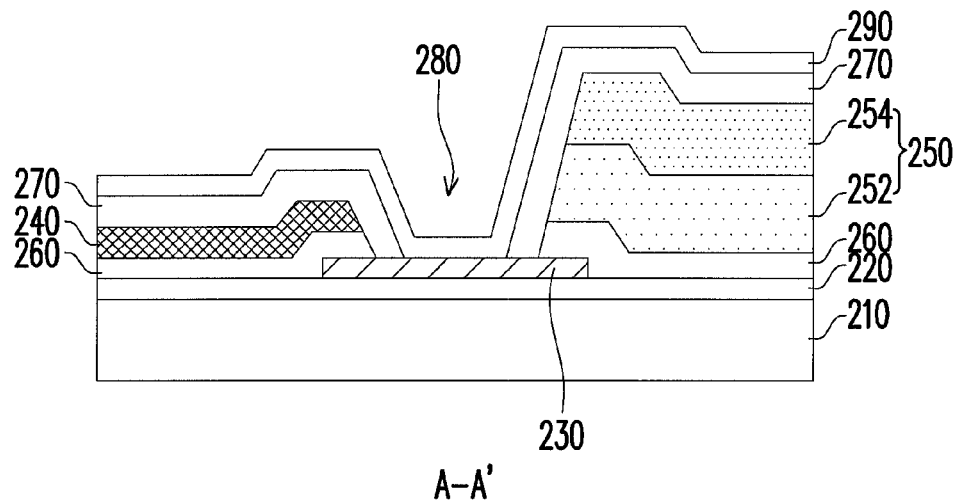
FIGS. 2B to 2E each shows a possible cross-sectional structure of the contact window in FIG. 2A.

In the cross-sectional structure shown in FIG. 2B, the color filter pattern 250 is formed by two filters 252 and 254 of different colors. In the cross-sectional structure shown in FIG. 2C, the color filter pattern 250 is formed by the filter 252 of a single color. In the cross-sectional structure shown in FIG. 2D, the color filter pattern 250 is formed by three filters 252, 254, and 256 of different colors. Here, the filter is, for example, selected from one of the groups including any combination of a red filter, a green filter, a blue filter, and a white filter.

Figure 2C:
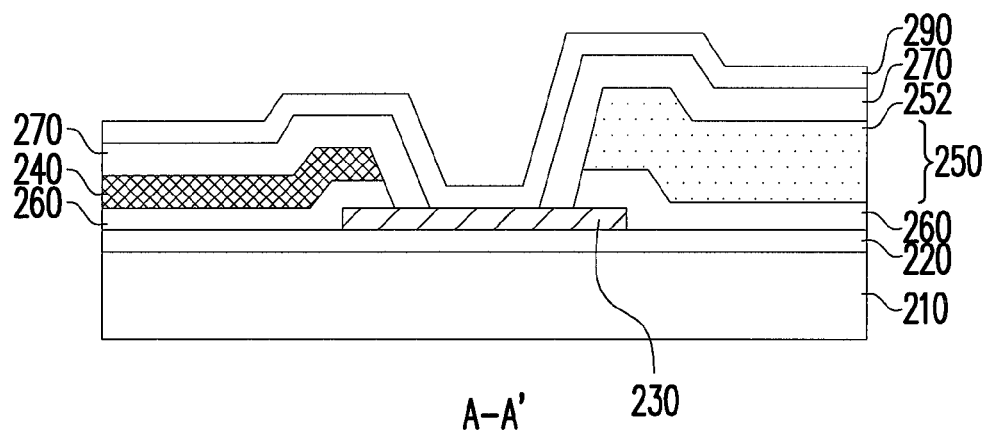
Figure 2D:
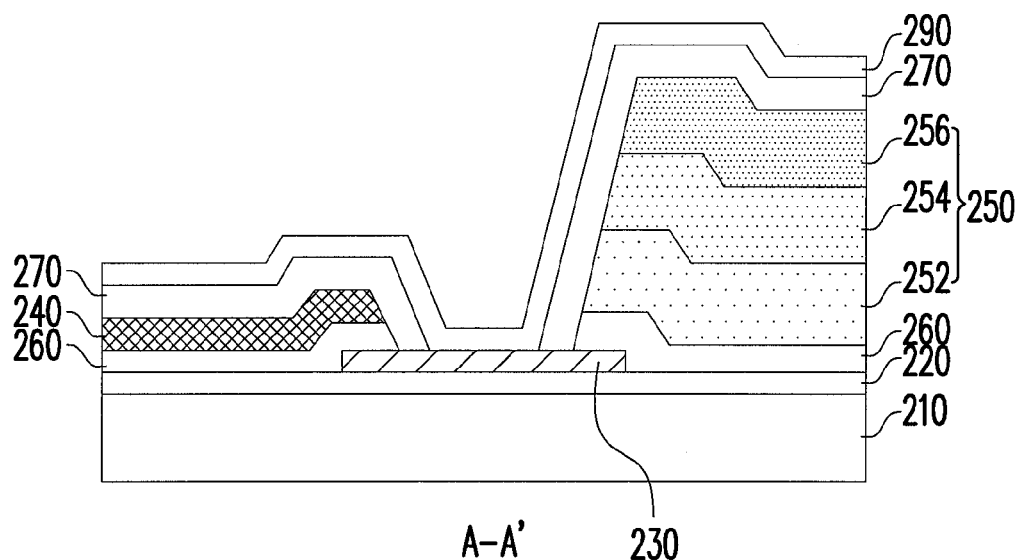
Figure 2E:
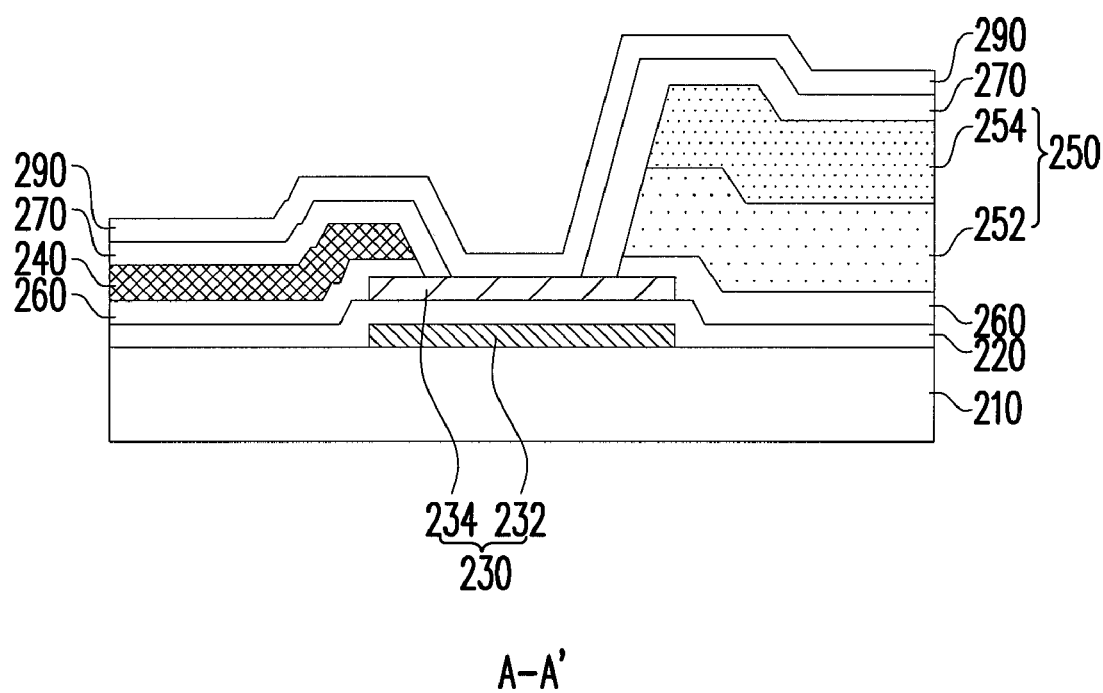

The pad 230 shown in FIGS. 2B to 2D is, for example, a metal pattern formed by a source and drain metal layer on the thin film transistor array substrate. In addition, the pad 230 shown in FIG. 2E includes a first pad pattern 232 formed by a gate metal layer and a second pad pattern 234 formed by the source and drain metal layer. It is certain that in other embodiments that are not shown, the pad 230 may be formed by the gate metal layer on the thin film transistor array substrate. In other words, the pad 230 may be a structure formed by a single metal pattern or by two or more metal patterns. According to the present embodiment, the pad 230 is formed by at least one of the gate metal layer and the source and drain metal layer.

The contact window in the present embodiment may be formed at the same time as the pixel structures in the display region. Using the contact window shown in FIG. 2E as an example, when forming the gate metal layer on the display panel, the first pad pattern 232 and the gate insulating layer 220 which covers the first pad pattern 232 are sequentially formed on the substrate 210. Afterwards, at the same time of forming the source and drain metal layer on the display panel, the second pad pattern 234 which is optional is formed on the gate insulating layer 220. In other words, the pad 230 is formed by the first pad pattern 232 and the second pad pattern 234, thereby having better light-shielding effects. Thereafter, a first passivation layer 260 is formed, so as to cover the second pad pattern 234. Then, the black matrix is formed on the first passivation layer 260, and the black matrix and the first passivation layer 260 are patterned, so as to expose a part of the second pad pattern 234 and the first passivation layer 260. Next, the color filter is formed to cover the second pad pattern 234 and the first passivation layer 260 which are exposed. The color filter is then patterned, so as to expose a part of the second pad pattern 234 and to define the region of the contact window 280 which is subsequently formed. Each of the black matrix pattern 240 and the color filter pattern 250 partially overlaps with the pad 230, Next, the second passivation layer 270 is optionally formed, so as to cover the second pad pattern 234, the black matrix pattern 240, and the color filter pattern 250. The contact window 280 which exposes the second pad pattern 234 is formed in the second passivation layer 270. Afterwards, at the same time of forming the pixel electrodes on the display panel, the conductive layer 290 is formed on the second passivation layer 270, and the conductive layer 290 is coupled to the second pad pattern 234 through the contact window 280. Hence, the process of fabricating the contact window according to the present embodiment is substantially completed.

According to the above embodiment, the sequence of forming the layers or patterns of the contact window 280 is the first passivation layer 260/the black matrix pattern 240/the color filter pattern 250/the second passivation layer 270/the conductive layer 290. While the process of fabricating the contact window of the present embodiment is not limited thereto and may be varied according to the fabrication process of the pixel structures in the display region. For example, in another embodiment, the sequence of forming the layers or patterns of the contact window 280 may be the first passivation layer 260/the color filter pattern 250/the second passivation layer 270/the conductive layer 290/the black matrix pattern 240.

In addition to the above embodiment, FIGS. 3A to 7B each further shows another embodiment in which two different types of transparent film layers are used as a light-shielding pattern. Relevant technical details are summarized in the following table:

| Figure Number | Composition of the light-shielding pattern |
| --- | --- |
| 3A and 3B | Black matrix + source and drain metal layer |
| 4A and 4B | Color filter + source and drain metal layer |
| 5A and 5B | Black matrix + gate metal layer |
| 6A and 6B | Color filter + gate metal layer |
| 7A and 7B | Gate metal layer + source and drain metal layer |

Further details are illustrated below.

Figure 3A:
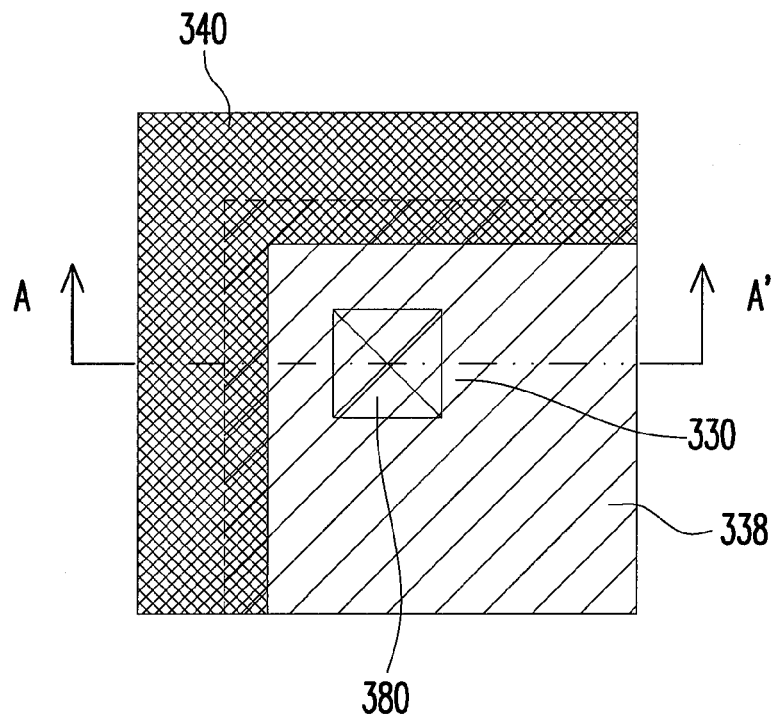
FIGS. 3A to 7B each shows another embodiment in which two different types of transparent film layers are used as a light-shielding pattern.
Figure 3B:
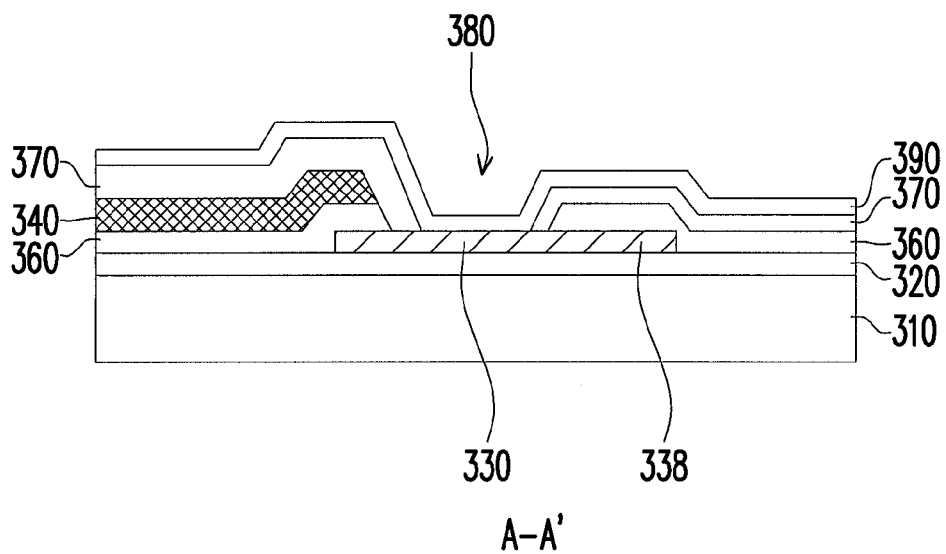

FIG. 3A shows a contact window in which the black matrix and the source and drain metal layer form the light-shielding pattern, and FIG. 3B shows a cross-sectional structure of the contact window in FIG. 3A. In order to clearly illustrate the positional relationships between relevant light-shielding film layers and the pad, film layers such as the gate insulating layer, the passivation layer, and the transparent conductive layer which are optional are omitted in FIG. 3A.

As shown in FIGS. 3A and 3B, a substrate 310 is covered by a gate insulating layer 320, and a pad 330 is disposed on the gate insulating layer 320. In addition, a contact window 380 is disposed on the pad 330 and exposes a part of the pad 330, so that another conductive layer 390 on the pad is connected to the pad 330 through the contact window 380. The pad 330 is, for example, a single-layer structure formed by the source and drain metal layer on the thin film transistor array substrate. The conductive layer 390 is, for example, a transparent conductive layer which is used to form pixel electrodes on the thin film transistor array substrate.

According to the present embodiment, a black matrix pattern 340 from the black matrix and a conductive pattern 338 from the source and drain metal layer jointly surround the contact window 380, so as to define the region of the contact window 380. The black matrix pattern 340 and the pad 330 partially overlap, and the conductive pattern 338 is a part extending from the pad 330 to outside the contact window 380. Thus, the black matrix pattern 340 and the conductive pattern 338 formed by the pad 330 extending outward are used to shield possible light leakage at the periphery of the contact window 380.

Moreover, the method of fabricating the contact window according to the present embodiment and the technical details of the first passivation layer 360 and the second passivation layer 370 which are optional may be referred to in the previous embodiment and are hence not repeatedly described.

Figure 4A:
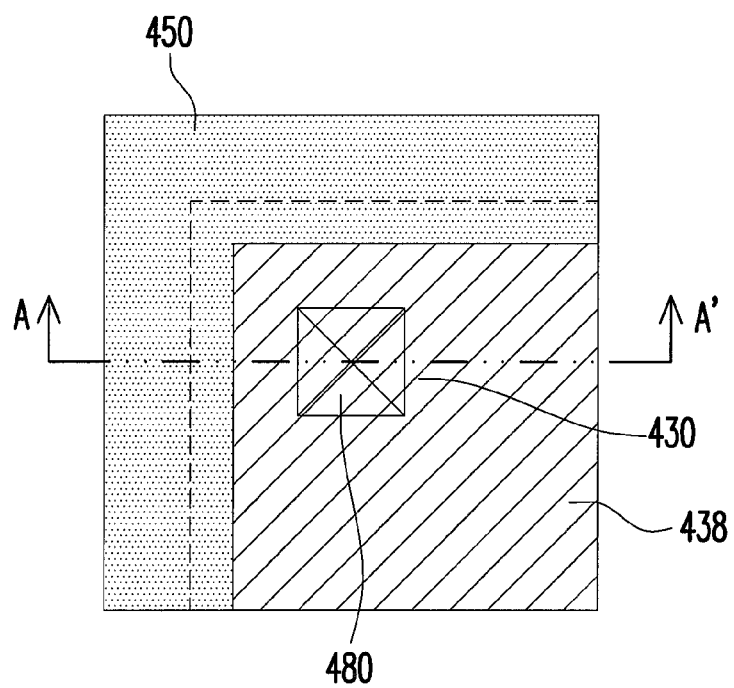
Figure 4B:
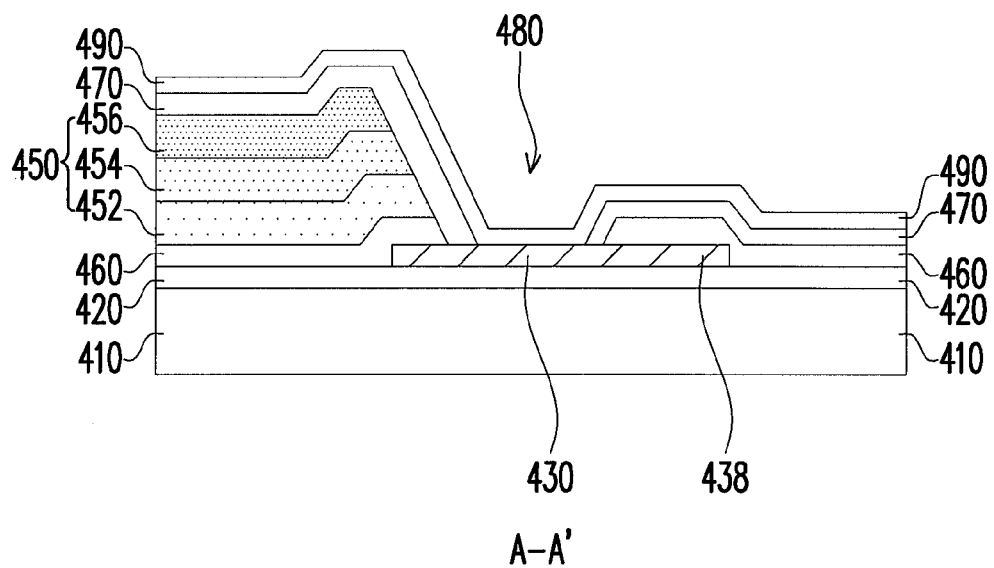

FIG. 4A shows a contact window in which the color filter and the source and drain metal layer form the light-shielding pattern, and FIG. 4B shows a cross-sectional structure of the contact window in FIG. 4A. In order to clearly illustrate the positional relationships between relevant light-shielding film layers and the pad, film layers such as the gate insulating layer, the passivation layer, and the transparent conductive layer which are optional are omitted in FIG. 4A.

As shown in FIGS. 4A and 4B, a substrate 410 is covered by a gate insulating layer 420, and a pad 430 is disposed on the gate insulating layer 420. In addition, a contact window 480 is disposed on the pad 430 and exposes a part of the pad 430, so that another conductive layer 490 on the pad is connected to the pad 430 through the contact window 480. The pad 430 is, for example, a single-layer structure formed by the source and drain metal layer on the thin film transistor array substrate. The conductive layer 490 is, for example, a transparent conductive layer which is used to form pixel electrodes on the thin film transistor array substrate.

According to the present embodiment, a color filter pattern 450 from the color filter and a conductive pattern 438 from the source and drain metal layer jointly surround the contact window 480, so as to define the region of the contact window 480. The color filter pattern 450 and the pad 430 partially overlap, and the conductive pattern 438 is a part extending from the pad 430 to outside the contact window 480. Thus, the color filter pattern 450 and the conductive pattern 438 formed by the pad 430 extending outward are used to shield possible light leakage at the periphery of the contact window 480.

According to the present embodiment, the color filter pattern 450 is formed by three filters 452, 454, and 456 of different colors. Beyond all question, the invention is not limited thereto. The filter is, for example, selected from one of the groups including any combination of a red filter, a green filter, a blue filter, and a white filter. One color filter or a plurality of color filters of the same color or different colors may be selected for use as a single layer or stacked as multiple layers. Moreover, the method of fabricating the contact window according to the present embodiment and the technical details of the first passivation layer 460 and the second passivation layer 470 which are optional may be referred to in the previous embodiments and are hence not repeatedly described.

Figure 5A:
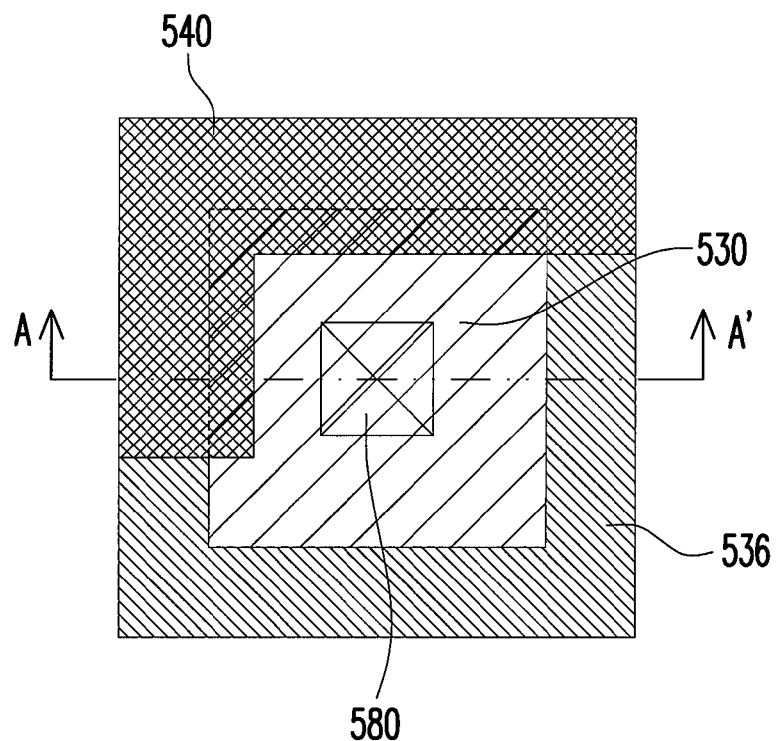
Figure 5B:
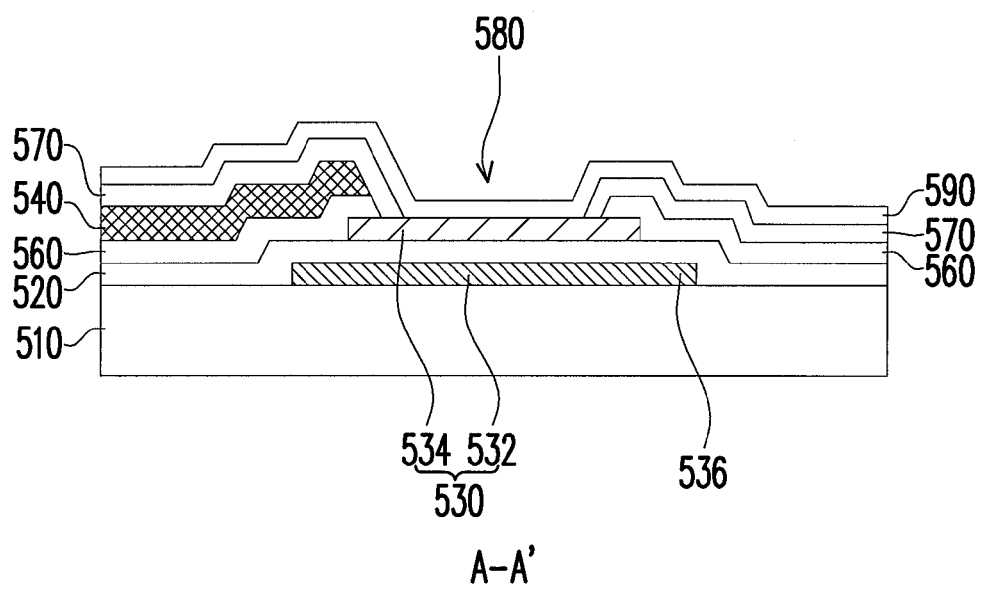

FIG. 5A shows a contact window in which the black matrix and the gate metal layer form the light-shielding pattern, and FIG. 5B shows a cross-sectional structure of the contact window in FIG. 5A. In order to clearly illustrate the positional relationships between relevant light-shielding film layers and the pad, film layers such as the gate insulating layer, the passivation layer, and the transparent conductive layer which are optional are omitted in FIG. 5A.

As shown in FIGS. 5A and 5B, a substrate 510 includes a pad 530. In addition, a contact window 580 is disposed on the pad 530 and exposes a part of the pad 530, so that another conductive layer 590 on the pad 530 is connected to the pad 530 through the contact window 580. According to the present embodiment, the pad 530 includes a first pad pattern 532 formed by the gate metal layer and a second pad pattern 534 formed by the source and drain metal layer. In other words, the pad 530 is formed by the first pad pattern 532 and the second pad pattern 534, thereby having better light-shielding effects. Moreover, the conductive layer 590 is, for example, a transparent conductive layer which is used to form pixel electrodes on the thin film transistor array substrate.

According to the present embodiment, a black matrix pattern 540 from the black matrix and a conductive pattern 536 from the gate metal layer jointly surround the contact window 580, so as to define the region of the contact window 580. The black matrix pattern 540 and the pad 530 partially overlap, and the conductive pattern 536 is a part extending from the first pad pattern 532 to outside the contact window 580. Thus, the black matrix pattern 540 and the conductive pattern 536 formed by the first pad pattern 532 extending outward are used to shield possible light leakage at the periphery of the contact window 580.

Moreover, the method of fabricating the contact window according to the present embodiment and the technical details of the gate insulating layer 520, the first passivation layer 560, and the second passivation layer 570 which are optional may be referred to in the previous embodiments and are hence not repeatedly described.

Figure 6A:
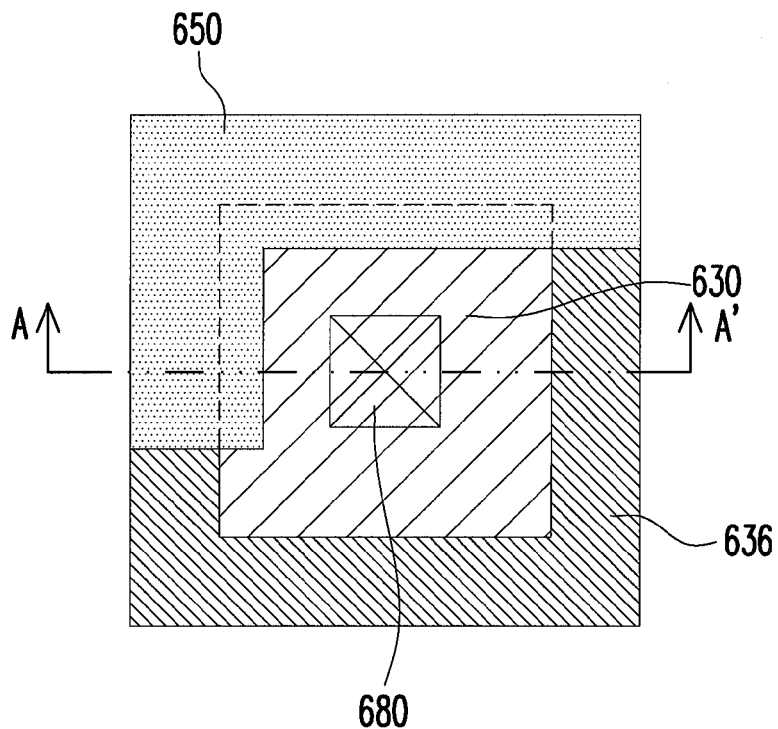
Figure 6B:
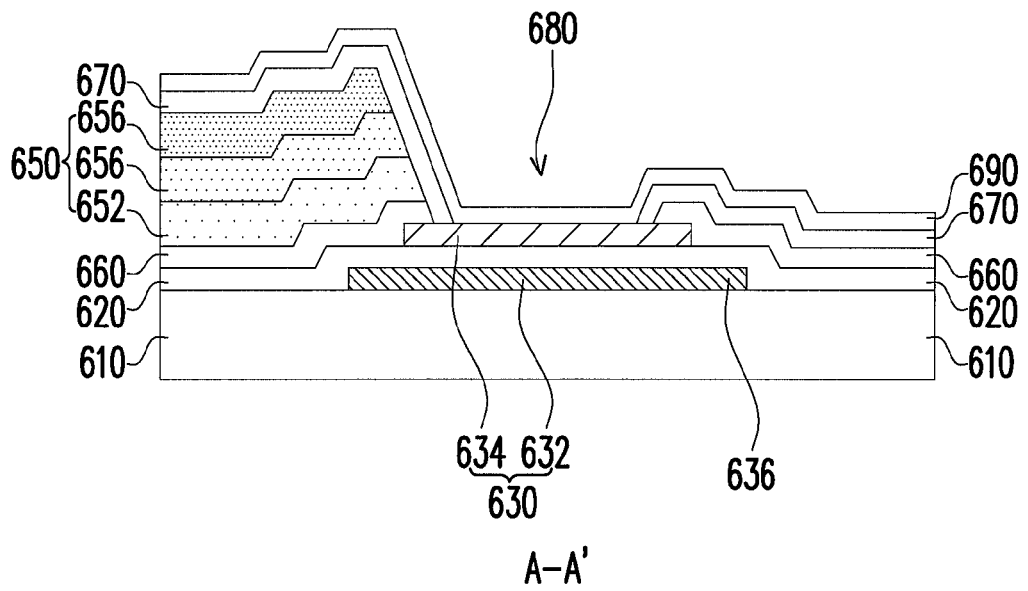

FIG. 6A shows a contact window in which the color filter and the gate metal layer form the light-shielding pattern, and FIG. 6B shows a cross-sectional structure of the contact window in FIG. 6A. In order to clearly illustrate the positional relationships between relevant light-shielding film layers and the pad, film layers such as the gate insulating layer, the passivation layer, and the transparent conductive layer which are optional are omitted in FIG. 6A.

As shown in FIGS. 6A and 6B, a substrate 610 includes a pad 630. In addition, a contact window 680 is disposed on the pad 630 and exposes a part of the pad 630, so that another conductive layer 690 on the pad 630 is connected to the pad 630 through the contact window 680. According to the present embodiment, the pad 630 includes a first pad pattern 632 formed by the gate metal layer and a second pad pattern 634 formed by the source and drain metal layer. In other words, the pad 630 is formed by the first pad pattern 632 and the second pad pattern 634, thereby having better light-shielding effects. The conductive layer 690 is, for example, a transparent conductive layer which is used to form pixel electrodes on the thin film transistor array substrate.

According to the present embodiment, a color filter pattern 650 from the color filter and a conductive pattern 636 from the gate metal layer jointly surround the contact window 680, so as to define the region of the contact window 680. The color filter pattern 650 and the pad 630 partially overlap, and the conductive pattern 636 is a part extending from the first pad pattern 632 to outside the contact window 680. Thus, the color filter pattern 650 and the conductive pattern 636 formed by the first pad pattern 632 extending outward are used to shield possible light leakage at the periphery of the contact window 680.

According to the present embodiment, the color filter pattern 650 is formed by three filters 652, 654, and 656 of different colors. Beyond all question, the invention is not limited thereto. The filter is, for example, selected from one of the groups including any combination of a red filter, a green filter, a blue filter, and a white filter. One color filter or a plurality of color filters of the same color or different colors may be selected for use as a single layer or stacked as multiple layers. Moreover, the method of fabricating the contact window according to the present embodiment and the technical details of the gate insulating layer 620, the first passivation layer 660, and the second passivation layer 670 which are optional may be referred to in the previous embodiment and are hence not repeatedly described.

Figure 7A:
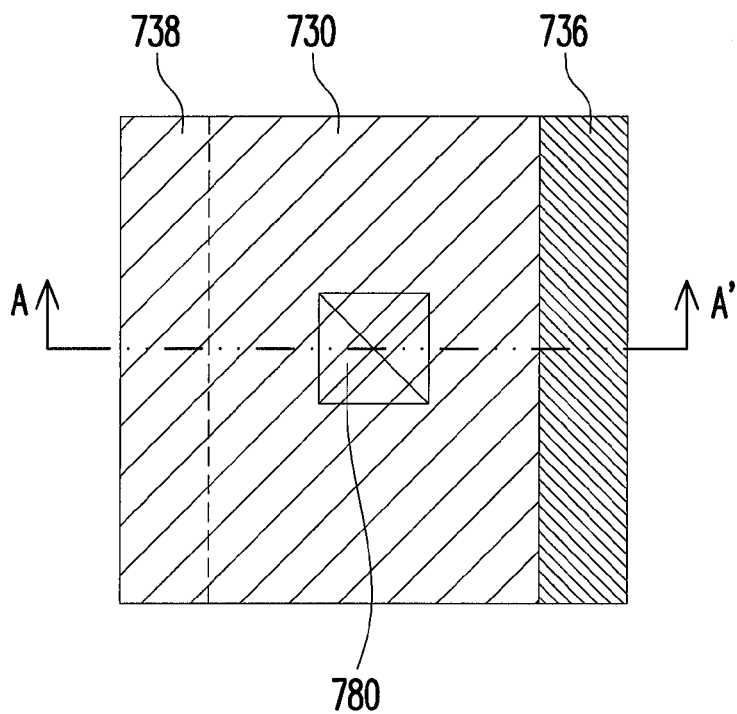
Figure 7B:
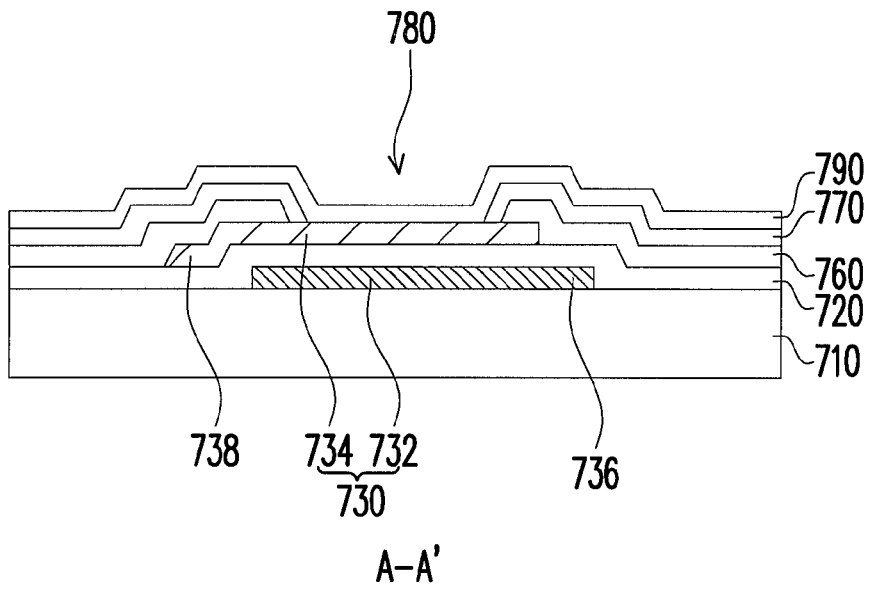

FIG. 7A shows a contact window in which the gate metal layer and the source and drain metal layer form the light-shielding pattern, and FIG. 7B shows a cross-sectional structure of the contact window in FIG. 7A. In order to clearly illustrate the positional relationships between relevant light-shielding film layers and the pad, film layers such as the gate insulating layer, the passivation layer, and the transparent conductive layer which are optional are omitted in FIG. 7A.

As shown in FIGS. 7A and 7B, a substrate 710 includes a pad 730. In addition, a contact window 780 is disposed on the pad 730 and exposes a part of the pad 730, so that another conductive layer 790 on the pad 730 is connected to the pad 730 through the contact window 780. According to the present embodiment, the pad 730 includes a first pad pattern 732 formed by the gate metal layer and a second pad pattern 734 formed by the source and drain metal layer. In other words, the pad 730 is formed by the first pad pattern 732 and the second pad pattern 734, thereby having better light-shielding effects. The conductive layer 790 is, for example, a transparent conductive layer which is used to form pixel electrodes on the thin film transistor array substrate.

According to the present embodiment, a conductive pattern 736 from the gate metal layer and a conductive pattern 738 from the source and drain metal layer jointly surround the contact window 780, so as to define the region of the contact window 780. The conductive pattern 736 is a part extending from the first pad pattern 732 to outside the contact window 780, and the conductive pattern 738 is a part extending from the second pad pattern 734 to outside the contact window 780. Thus, the conductive pattern 736 formed by the first pad pattern 732 extending outward and the conductive pattern 738 formed by the second pad pattern 734 extending outward are used to shield possible light leakage at the periphery of the contact window 780.

Moreover, the method of fabricating the contact window according to the present embodiment and the technical details of the gate insulating layer 720, the first passivation layer 760, and the second passivation layer 770 which are optional may be referred to in the previous embodiments and are hence not repeatedly described.

In addition to the above embodiments, FIGS. 8A to 8D each further shows another embodiment in which three different types of transparent film layers are used as a light-shielding pattern. Relevant technical details are summarized in the following table:

| Figure Number | Composition of the light-shielding pattern |
|---|---|
| 8A | Black matrix + color filter + gate metal layer |
| 8B | Black matrix + color filter + source and drain metal layer |
| 8C | Color filter + gate metal layer + source and drain metal layer |
| 8D | Black matrix + gate metal layer + source and drain metal layer |

Further details are illustrated below.

FIGS. 8A to 8D each shows a top view of a different contact window. Here technical details similar to those in the previous embodiments are not repeatedly described, and relevant cross-sectional structures and methods of fabrication may be referred to in the descriptions in the previous embodiments.

Figure 8A:
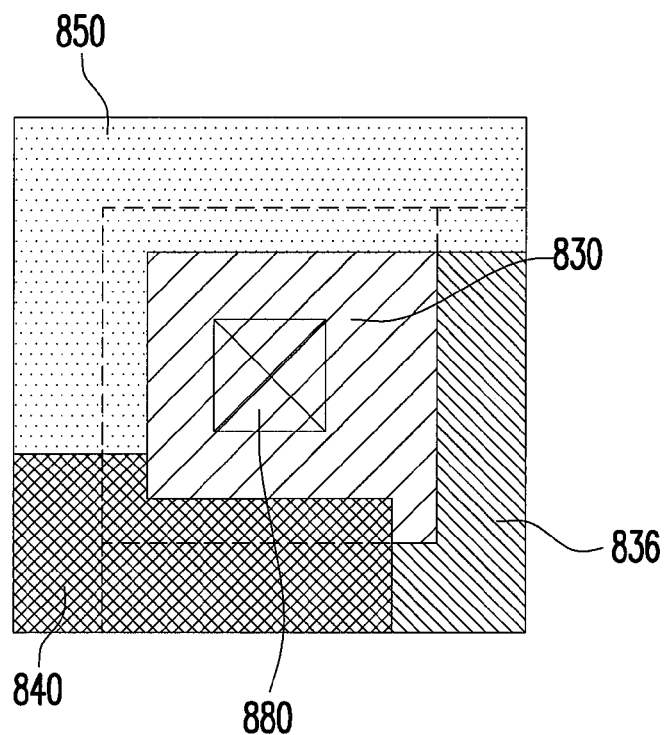
FIGS. 8A to 8D each shows another embodiment in which three different types of transparent film layers are used as a light-shielding pattern.

The contact window in FIG. 8A adopts the black matrix, the color filter, and the gate metal layer to form the light-shielding pattern. In detail, a black matrix pattern 840 from the black matrix, a color filter pattern 850 from the color filter, and a conductive pattern 836 from the gate metal layer jointly surround a contact window 880, so as to define the region of the contact window 880. The black matrix pattern 840 and the pad 830 partially overlap, and the color filter pattern 850 and the pad 830 partially overlap. The conductive pattern 836 is a part extending from the first pad pattern to outside the contact window 880. Thus, the black matrix pattern 840, the color filter pattern 850, and the conductive pattern 836 formed by the first pad pattern of the pad 830 extending outward are used to shield possible light leakage at the periphery of the contact window 880.

Figure 8B:
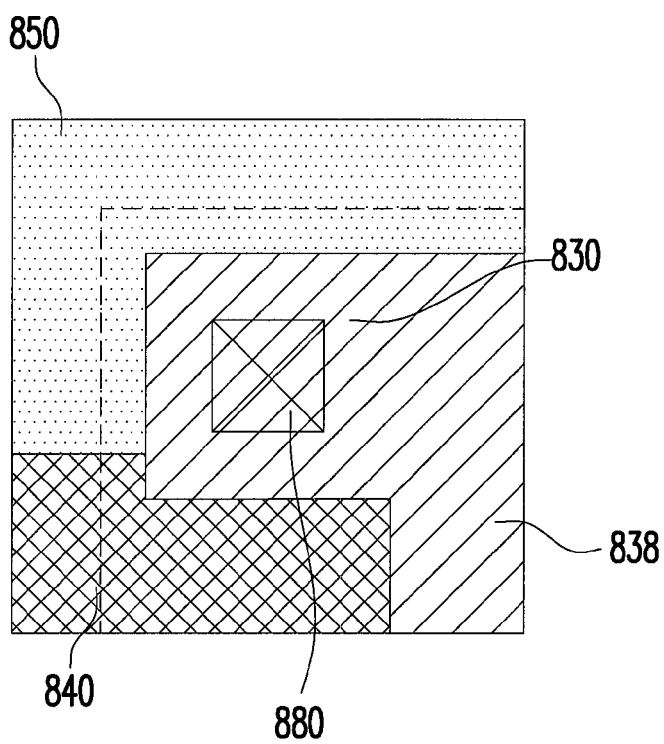

The contact window in FIG. 8B adopts the black matrix, the color filter, and the source and drain metal layer to form the light-shielding pattern. In detail, the black matrix pattern 840 from the black matrix, the color filter pattern 850 from the color filter, and a conductive pattern 838 from the source and drain metal layer jointly surround the contact window 880, so as to define the region of the contact window 880. The black matrix pattern 840 and the pad 830 partially overlap, and the color filter pattern 850 and the pad 830 partially overlap. The conductive pattern 838 is a part extending from the pad pattern of the pad 830 to outside the contact window 880. Thus, the black matrix pattern 840, the color filter pattern 850, and the conductive pattern 838 formed by the pad pattern of the pad 830 extending outward are used to shield possible light leakage at the periphery of the contact window 880.

Figure 8C:
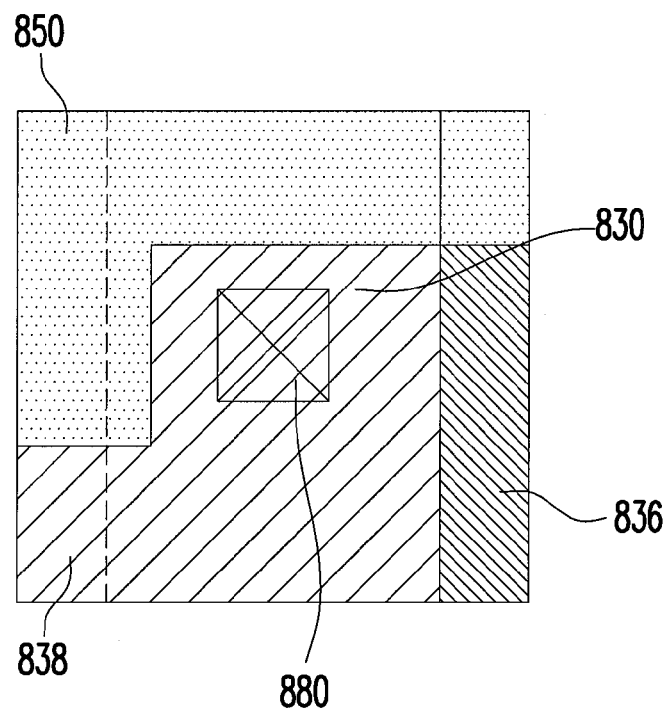

The contact window in FIG. 8C adopts the color filter, the gate metal layer, and the source and drain metal layer to form the light-shielding pattern. In detail, the color filter pattern 850 from the color filter, the conductive pattern 836 from the gate metal layer, and a conductive pattern 838 from the source and drain metal layer jointly surround the contact window 880, so as to define the region of the contact window 880. The color filter pattern 850 and the pad 830 partially overlap. The conductive pattern 836 is a part extending from the first pad pattern of the pad 830 to outside the contact window 880, and the conductive pattern 838 is a part extending from the second pad pattern of the pad 830 to outside the contact window 880. Thus, the color filter pattern 850, the conductive pattern 836 formed by the first pad pattern of the pad 830 extending outward, and the conductive pattern 838 formed by the second pad pattern of the pad 830 extending outward are used to shield possible light leakage at the periphery of the contact window 880.

Figure 8D:
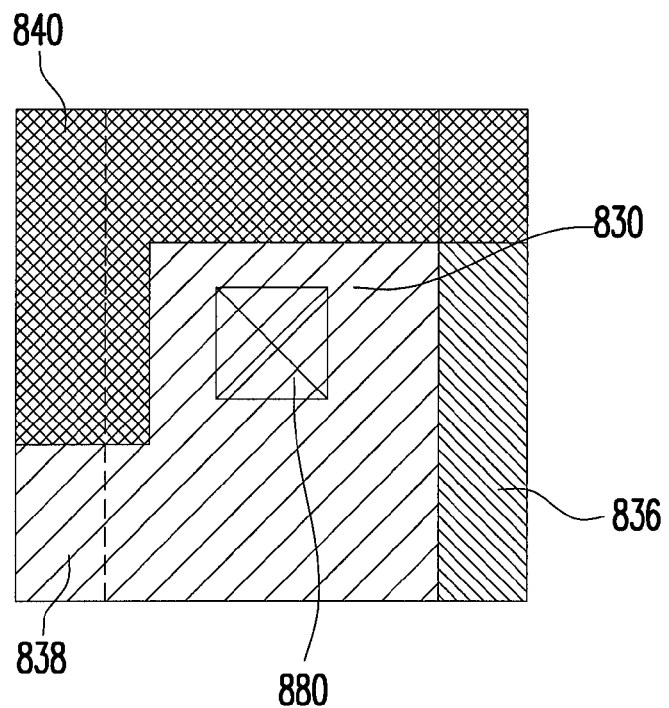

The contact window in FIG. 8D adopts the black matrix, the gate metal layer, and the source and drain metal layer to form the light-shielding pattern. In detail, the black matrix pattern 840 from the black matrix, the conductive pattern 836 from the gate metal layer, and the conductive pattern 838 from the source and drain metal layer jointly surround the contact window 880, so as to define the region of the contact window 880. The black matrix pattern 840 and the pad 830 partially overlap. The conductive pattern 836 is a part extending from the first pad pattern of the pad 830 to outside the contact window 880, and the conductive pattern 838 is a part extending from the second pad pattern of the pad 830 to outside the contact window 880. Thus, the black matrix pattern 840, the conductive pattern 836 formed by the first pad pattern of the pad 830 extending outward, and the conductive pattern 838 formed by the second pad pattern of the pad 830 extending outward are used to shield possible light leakage at the periphery of the contact window 880.

Figure 9:
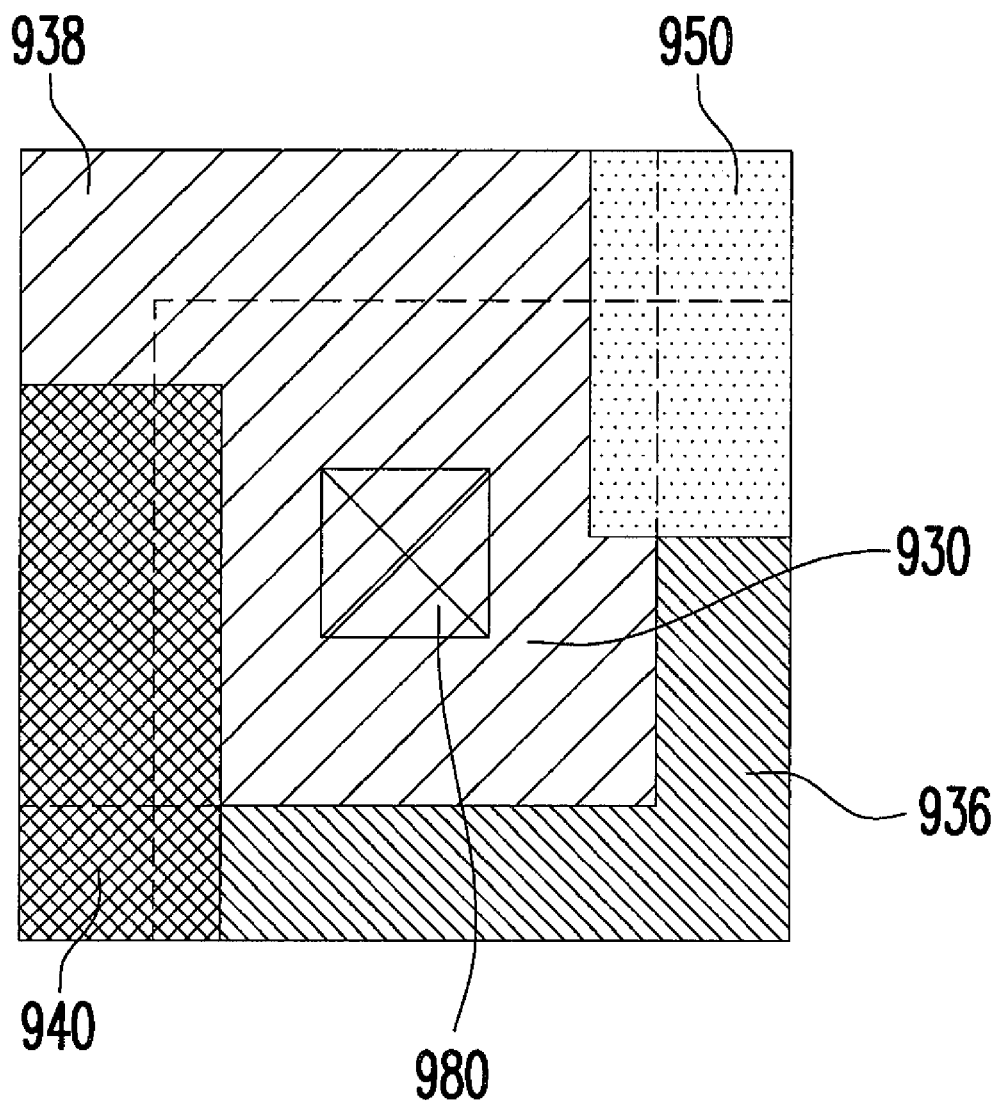
FIG. 9 shows a contact window in which four different types of transparent film layers are used as a light-shielding pattern.

FIG. 9 further shows a contact window in which four different types of transparent film layers are used as a light-shielding pattern. Here technical details similar to those in the previous embodiments are not repeatedly described, and relevant cross-sectional structures and methods of fabrication may be referred to in the descriptions in the previous embodiments. As shown in FIG. 9, the contact window adopts the black matrix, the color filter, the gate metal layer, and the source and drain metal layer to form the light-shielding pattern. In detail, a black matrix pattern 940 from the black matrix, a color filter pattern 950 from the color filter, a conductive pattern 936 from the gate metal layer, and a conductive pattern 938 from the source and drain metal layer jointly surround a contact window 980, so as to define the region of the contact window 980. The black matrix pattern 940 and the pad 930 partially overlap, and the color filter pattern 950 and the pad 930 partially overlap. It should be noted that in the method of forming the light-shielding pattern by the color filter, the gate metal layer, and the source and drain metal layer, the stacking relationships of the layers are not limited thereto; one of ordinary skill in the art may adopt different stacking methods according to design requirements. In addition, the conductive pattern 936 is a part extending from the first pad pattern of the pad 930 to outside the contact window 980, and the conductive pattern 938 is a part extending from the second pad pattern of the pad to outside the contact window 980. Thus, the black matrix pattern 940, the color filter pattern 950, the conductive pattern 936 formed by the first pad pattern of the pad 930 extending outward, and the conductive pattern 938 formed by the second pad pattern of the pad 930 extending outward are used to shield possible light leakage at the periphery of the contact window 980.

On the other hand, in order to further prevent light leakage at the region of the contact window in the invention, a spacer corresponding to the contact window may be formed on the display panel, so as to prevent the display medium at the periphery of the contact window, such as liquid crystal molecules, from being affected by the voltage or topography of the pad, thereby preventing light leakage caused by irregular arrangement of the display medium.

Figure 10A:
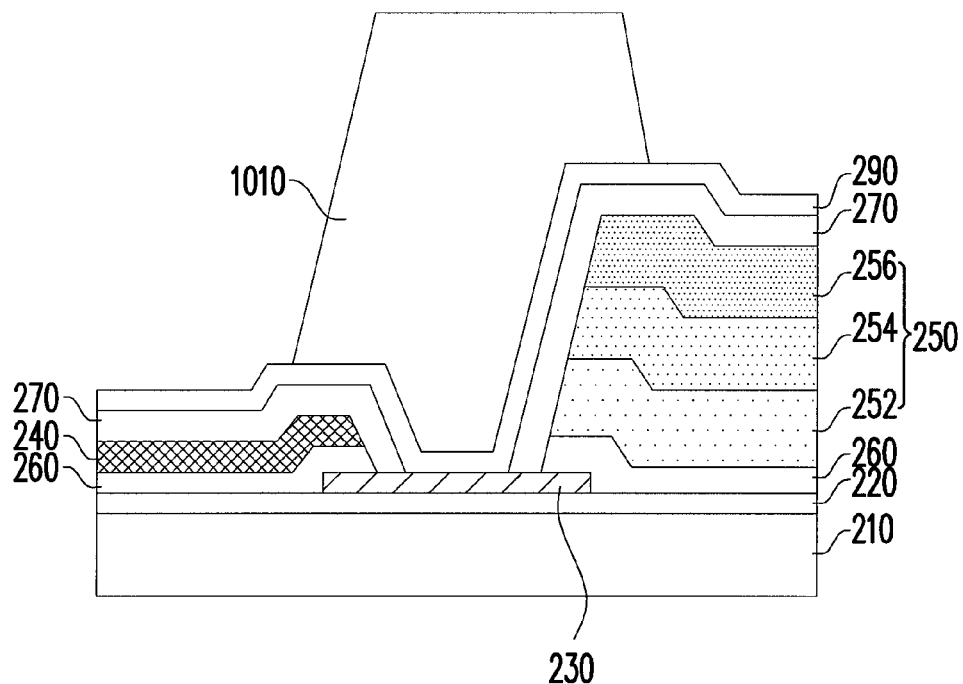
FIGS. 10A to 10F each shows a contact window which has a spacer according to an embodiment of the invention.
Figure 10B:
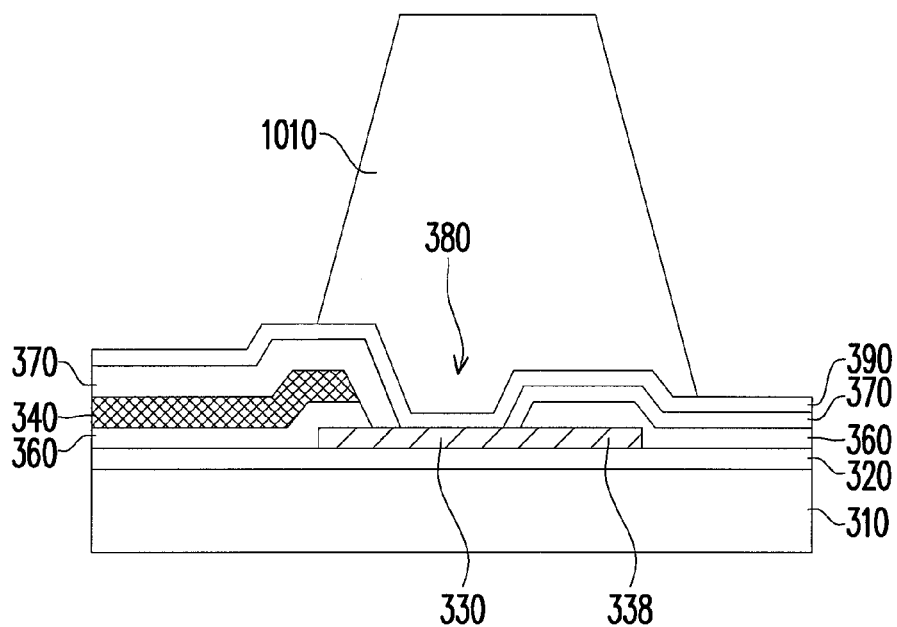
Figure 10C:
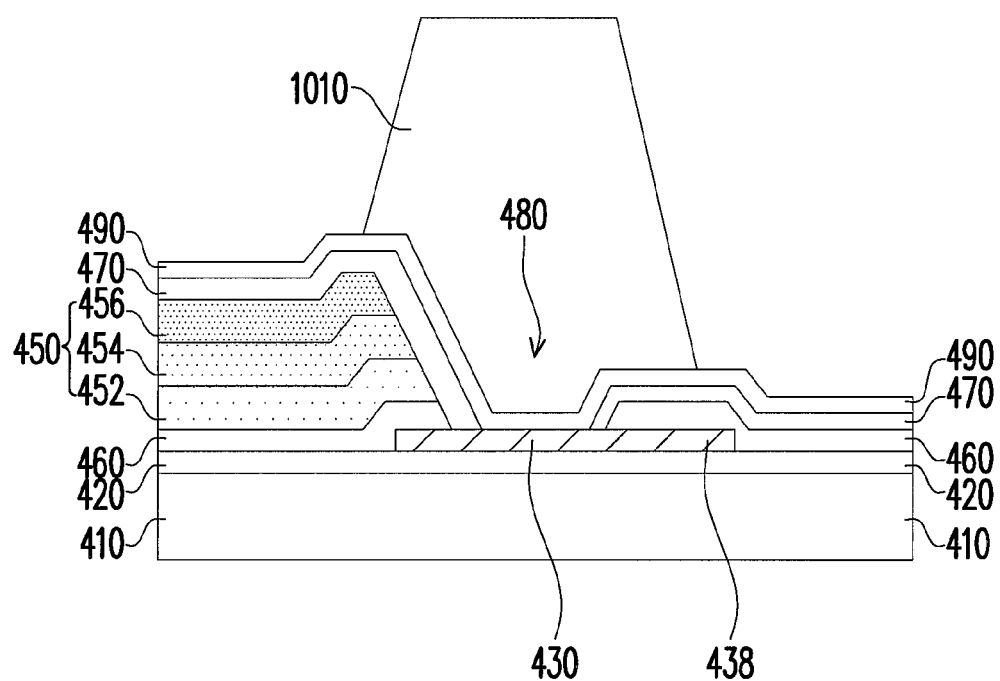
Figure 10D:
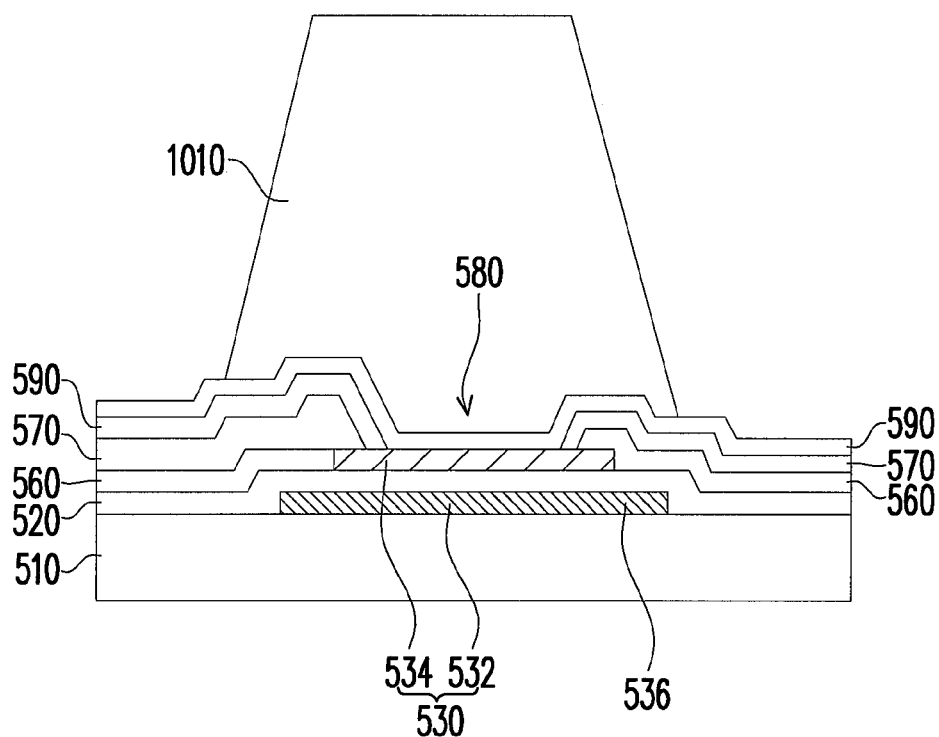
Figure 10E:
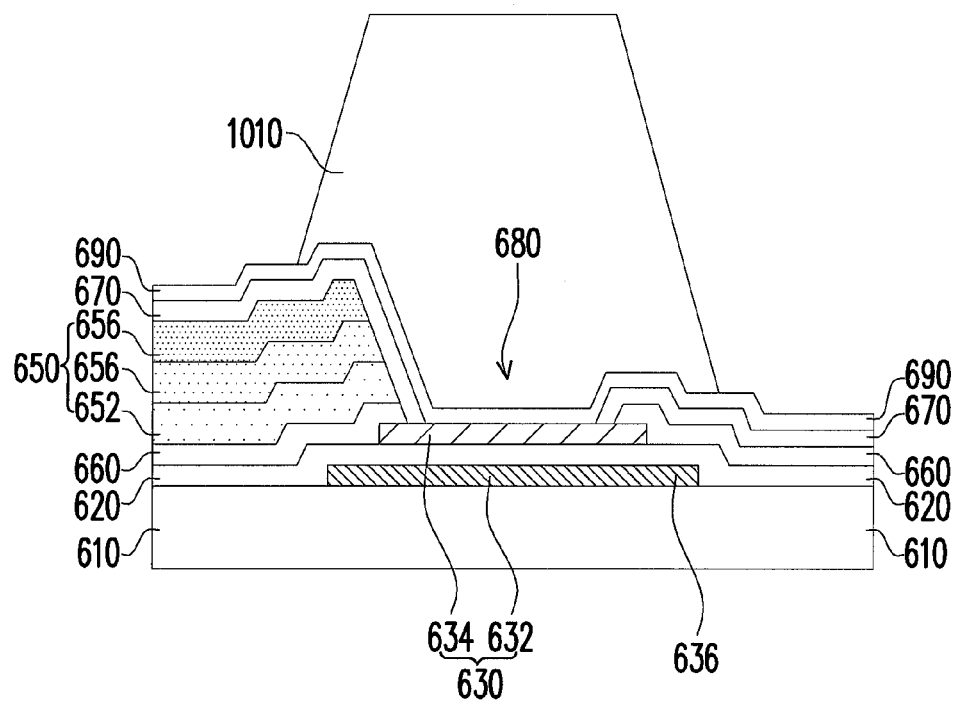
Figure 10F:
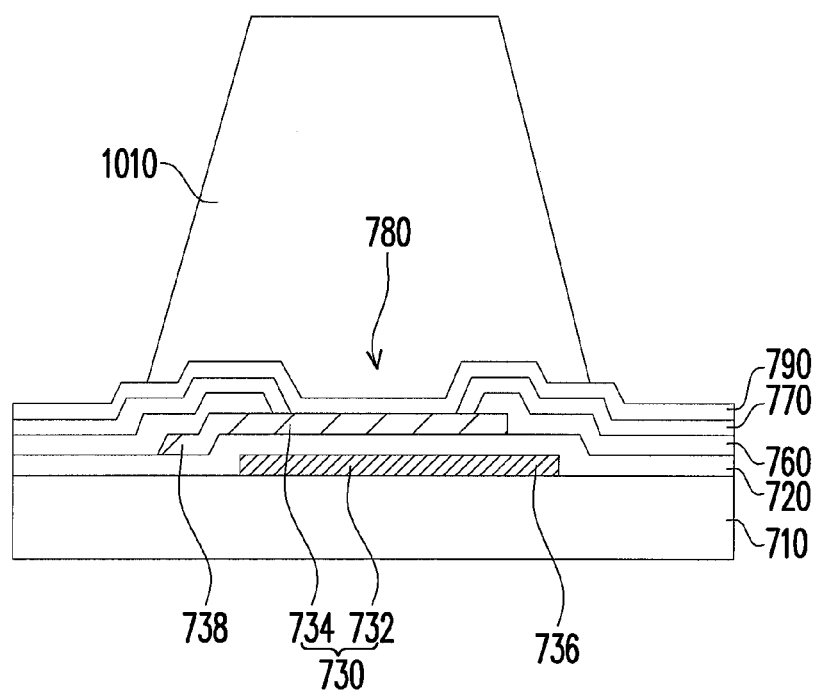

FIGS. 10A to 10F each shows a contact window which has a spacer according to an embodiment of the invention. FIG. 10A shows a schematic view of a spacer 1010 formed on the contact window in FIG. 2D. FIG. 10B shows a schematic view of the spacer 1010 formed on the contact window in FIG. 3B. FIG. 10C shows a schematic view of the spacer 1010 formed on the contact window in FIG. 4B. FIG. 10D shows a schematic view of the spacer 1010 formed on the contact window in FIG. 5B. FIG. 10E shows a schematic view of the spacer 1010 formed on the contact window in FIG. 6B. FIG. 10F shows a schematic view of the spacer 1010 formed on the contact window in FIG. 7B.

The spacer 1010 shown in FIGS. 10A to 10F is disposed on the pads 230, 330, 430, 530, 630, and 730, and the spacer 1010 needs to at least cover the pads 230, 330, 430, 530, 630, and 730, that is, covering the joint region of the first conductive layer (which is the first pad pattern) and the second conductive layer (which is the second pad pattern) which form the pads 230, 330, 430, 530, 630, and 730. Here technical details similar to those in the previous embodiments are not repeatedly described, and relevant cross-sectional structures and methods of fabrication may be referred to in the descriptions in the previous embodiments.

In summary, the invention adopts various types of combinations of non-transparent film layers such as the black matrix, the color filter, the gate metal layer, and the source and drain metal layer which optionally exist on the active device array substrate to shield light leakage at the periphery of the contact window. Thus, the size of the contact window is not limited by the size of the opening that may be formed in the black matrix, that is, not being limited by the resolution of the process of the black matrix, thereby being beneficial to reducing fabricating costs and enhancing reliability of processes. Moreover, fabrication of the contact window provided by the invention is capable of being integrated to original processes of the active device array substrate, so that there is no additional burden on the processes. In addition, in the invention, the spacer may be formed on the position of the display panel corresponding to the contact window, so that the spacer is used for further reducing light leakage at the periphery of the contact window.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An active device array substrate, comprising:
a substrate, comprising a display region and a periphery circuit region;
an active device array, disposed in the display region of the substrate;
a black matrix, disposed on the substrate;
a color filter, disposed on the substrate;
at least a pad, located in the display region or the periphery circuit region, wherein the pad is formed by at least one of a first conductive layer and a second conductive layer, and the first conductive layer is below the second conductive layer; and
at least a contact window, disposed on the pad, so that a third conductive layer above the pad is connected to the pad through the contact window, wherein the contact window is jointly surrounded by at least two different types of light-shielding patterns, and each of the light-shielding patterns only surrounds a part of a periphery of the contact window, and wherein the at least two types of light-shielding patterns are selected from at least two of the black matrix, the color filter, the first conductive layer and the second conductive layer.

2. The active device array substrate of claim 1, wherein the contact window is jointly surrounded by a black matrix pattern from the black matrix and by a color filter pattern from the color filter, the black matrix pattern and the pad partially overlapping, and the color filter pattern and the pad partially overlapping.

3. The active device array substrate of claim 1, wherein the contact window is jointly surrounded by a first conductive pattern from the first conductive layer and by a black matrix pattern from the black matrix, the first conductive pattern extending from the pad to outside the contact window, and the black matrix pattern and the pad partially overlapping.

4. The active device array substrate of claim 1, wherein the contact window is jointly surrounded by a second conductive pattern from the second conductive layer and by a black matrix pattern from the black matrix, the second conductive pattern extending from the pad to outside the contact window, and the black matrix pattern and the pad partially overlapping.

5. The active device array substrate of claim 1, wherein the contact window is jointly surrounded by a first conductive pattern from the first conductive layer and by a color filter pattern from the color filter, the first conductive pattern extending from the pad to outside the contact window, and the color filter pattern and the pad partially overlapping.

6. The active device array substrate of claim 1, wherein the contact window is jointly surrounded by a second conductive pattern from the second conductive layer and by a color filter pattern from the color filter, the second conductive pattern extending from the pad to outside the contact window, and the color filter pattern and the pad partially overlapping.

7. The active device array substrate of claim 1, wherein the contact window is jointly surrounded by a first conductive pattern from the first conductive layer and by a second conductive pattern from the second conductive layer, each of the first conductive pattern and the second conductive pattern extending from the pad to outside the contact window.

8. The active device array substrate of claim 1, wherein the contact window is jointly surrounded by a first conductive pattern from the first conductive layer, by a second conductive pattern from the second conductive layer, and by a black matrix pattern from the black matrix, the first conductive pattern extending from the pad to outside the contact window, the second conductive pattern extending from the pad to outside the contact window, and the black matrix pattern and the pad partially overlapping.

9. The active device array substrate of claim 1, wherein the contact window is jointly surrounded by a first conductive pattern from the first conductive layer, by a second conductive pattern from the second conductive layer, and by a color filter pattern from the color filter, the first conductive pattern extending from the pad to outside the contact window, the second conductive pattern extending from the pad to outside the contact window, and the color filter pattern and the pad partially overlapping.

10. The active device array substrate of claim 1, wherein the contact window is jointly surrounded by a first conductive pattern from the first conductive layer, by a color filter pattern from the color filter, and by a black matrix pattern from the black matrix, the first conductive pattern extending from the pad to outside the contact window, the color filter pattern and the pad partially overlapping, and the black matrix pattern and the pad partially overlapping.

11. The active device array substrate of claim 1, wherein the contact window is jointly surrounded by a second conductive pattern from the second conductive layer, by a color filter pattern from the color filter, and by a black matrix pattern from the black matrix, the second conductive pattern extending from the pad to outside the contact window, the color filter pattern and the pad partially overlapping, and the black matrix pattern and the pad partially overlapping.

12. The active device array substrate of claim 1, wherein the contact window is jointly surrounded by a first conductive pattern from the first conductive layer, by a second conductive pattern from the second conductive layer, by a color filter pattern from the color filter, and by a black matrix pattern from the black matrix, the first conductive pattern extending from the pad to outside the contact window, the second conductive pattern extending from the pad to outside the contact window, the color filter pattern and the pad partially overlapping, and the black matrix pattern and the pad partially overlapping.

13. The active device array substrate of claim 1, wherein the pad comprises a second conductive pattern from the second conductive layer, the contact window exposes at least a part of the second conductive pattern, and the third conductive layer is connected to the second conductive pattern through the contact window.

14. The active device array substrate of claim 1, further comprising a spacer which is disposed on the pad and covers at least a joint region of the first conductive layer and the second conductive layer.

15. The active device array substrate of claim 1, wherein the color filter is selected from at least one of a plurality of groups comprising any combination of a red filter, a green filter, a blue filter, and a white filter.

16. The active device array substrate of claim 1, wherein the first conductive layer or the second conductive layer is a metal layer.

17. The active device array substrate of claim 1, wherein the third conductive layer is a transparent conductive layer.

18. The active device array substrate of claim 1, wherein the active device array is a thin film transistor array.

19. A display panel, comprising:
an active device array substrate, comprising:
a substrate, comprising a display region and a periphery circuit region;
an active device array, disposed in the display region of the substrate;
a black matrix, disposed on the substrate;
a color filter, disposed on the substrate;
at least a pad, located in the display region or the periphery circuit region, wherein the pad is formed by at least one of a first conductive layer and a second conductive layer, and the first conductive layer is below the second conductive layer;
at least a contact window, disposed on the pad, so that a third conductive layer above the pad is connected to the pad through the contact window, wherein the contact window is jointly surrounded by at least two different types of light-shielding patterns, and each of the light-shielding patterns only surrounds a part of a periphery of the contact window, and wherein the at least two types of light-shielding patterns are selected from at least two of the black matrix, the color filter, the first conductive layer, and the second conductive layer;
an opposite substrate; and
a display medium layer, disposed between the active device array substrate and the opposite substrate.

20. The display panel of claim 19, wherein the contact window is jointly surrounded by a black matrix pattern from the black matrix and by a color filter pattern from the color filter, the black matrix pattern and the pad partially overlapping, and the color filter pattern and the pad partially overlapping.

21. The display panel of claim 19, wherein the contact window is jointly surrounded by a first conductive pattern from the first conductive layer and by a black matrix pattern from the black matrix, the first conductive pattern extending from the pad to outside the contact window, and the black matrix pattern and the pad partially overlapping.

22. The display panel of claim 19, wherein the contact window is jointly surrounded by a second conductive pattern from the second conductive layer and by a black matrix pattern from the black matrix, the second conductive pattern extending from the pad to outside the contact window, and the black matrix pattern and the pad partially overlapping.

23. The display panel of claim 19, wherein the contact window is jointly surrounded by a first conductive pattern from the first conductive layer and by a color filter pattern from the color filter, the first conductive pattern extending from the pad to outside the contact window, and the color filter pattern and the pad partially overlapping.

24. The display panel of claim 19, wherein the contact window is jointly surrounded by a second conductive pattern from the second conductive layer and by a color filter pattern from the color filter, the second conductive pattern extending from the pad to outside the contact window, and the color filter pattern and the pad partially overlapping.

25. The display panel of claim 19, wherein the contact window is jointly surrounded by a first conductive pattern from the first conductive layer and by a second conductive pattern from the second conductive layer, each of the first conductive pattern and the second conductive pattern extending from the pad to outside the contact window.

26. The display panel of claim 19, wherein the contact window is jointly surrounded by a first conductive pattern from the first conductive layer, by a second conductive pattern from the second conductive layer, and by a black matrix pattern from the black matrix, the first conductive pattern extending from the pad to outside the contact window, the second conductive pattern extending from the pad to outside the contact window, and the black matrix pattern and the pad partially overlapping.

27. The display panel of claim 19, wherein the contact window is jointly surrounded by a first conductive pattern from the first conductive layer, by a second conductive pattern from the second conductive layer, and by a color filter pattern from the color filter, the first conductive pattern extending from the pad to outside the contact window, the second conductive pattern extending from the pad to outside the contact window, and the color filter pattern and the pad partially overlapping.

28. The display panel of claim 19, wherein the contact window is jointly surrounded by a first conductive pattern from the first conductive layer, by a color filter pattern from the color filter, and by a black matrix pattern from the black matrix, the first conductive pattern extending from the pad to outside the contact window, the color filter pattern and the pad partially overlapping, and the black matrix pattern and the pad partially overlapping.

29. The display panel of claim 19, wherein the contact window is jointly surrounded by a second conductive pattern from the second conductive layer, by a color filter pattern from the color filter, and by a black matrix pattern from the black matrix, the second conductive pattern extending from the pad to outside the contact window, the color filter pattern and the pad partially overlapping, and the black matrix pattern and the pad partially overlapping.

30. The display panel of claim 19, wherein the contact window is jointly surrounded by a first conductive pattern from the first conductive layer, by a second conductive pattern from the second conductive layer, by a color filter pattern from the color filter, and by a black matrix pattern from the black matrix, the first conductive pattern extending from the pad to outside the contact window, the second conductive pattern extending from the pad to outside the contact window, the color filter pattern and the pad partially overlapping, and the black matrix pattern and the pad partially overlapping.

31. The display panel of claim 19, wherein the pad comprises a second conductive pattern from the second conductive layer, the contact window exposes at least a part of the second conductive pattern, and the third conductive layer is connected to the second conductive pattern through the contact window.

32. The display panel of claim 19, further comprising a spacer which is disposed between the active device array substrate and the opposite substrate and on the pad and covers at least a joint region of the first conductive layer and the second conductive layer.

33. The display panel of claim 19, wherein the color filter is selected from at least one of a plurality of groups comprising any combination of a red filter, a green filter, a blue filter, and a white filter.

34. The display panel of claim 19, wherein the first conductive layer or the second conductive layer is a metal layer.

35. The display panel of claim 19, wherein the third conductive layer is a transparent conductive layer.

36. The display panel of claim 19, wherein the active device array is a thin film transistor array.

37. The display panel of claim 19, wherein the display medium layer is a liquid crystal layer.

\* \* \* \* \*